United States Patent [19]

Matheny et al.

[11] 4,161,285

[45] Jul. 17, 1979

[54] LASER NOZZLE CONSTRUCTION

[75] Inventors: Paul Matheny, Tequesta; Joe T. Akin, Jupiter, both of Fla.

[73] Assignee: United Technologies Corporation, Hartford, Conn.

[21] Appl. No.: 863,494

[22] Filed: Dec. 22, 1977

[51] Int. Cl.² ............................................. B05B 15/00
[52] U.S. Cl. .................................. 239/132.3; 239/555; 239/568
[58] Field of Search ...................... 331/94.5 D, 94.5 G, 331/94.5 P; 239/132.3, 553.3, 553.5, 554, 555, 557, 568

[56] References Cited

U.S. PATENT DOCUMENTS

| | | | |
|---|---|---|---|
| 3,602,432 | 8/1971 | Mulready | 239/555 X |
| 3,819,321 | 6/1974 | Witt | 239/555 X |
| 3,986,138 | 10/1976 | Neal | 331/94.5 P |

FOREIGN PATENT DOCUMENTS

| | | | |
|---|---|---|---|
| 2413349 | 1/1976 | Fed. Rep. of Germany | 331/94.5 G |
| 2451309 | 5/1976 | Fed. Rep. of Germany | 331/94.5 D |

*Primary Examiner*—John J. Love
*Attorney, Agent, or Firm*—Jack N. McCarthy

[57] ABSTRACT

A laser nozzle, optical cavity walls, and combustion manifold system is formed having a plurality of laser nozzle members formed having two elongated projections on each side thereof, a forward projection and a rearward projection, and when said members are placed together, the rear projections meet to form a solid wall while said forward projections are spaced to form an elongated nozzle. Side plates enclose the ends of the nozzle members and end plates cover the ends of the side plates and exposed surface of the end nozzle members. The cavity formed between the two projections is fed a lasing gas through openings in the side plates from a manifold system. The laser nozzle members can be internally cooled along with associated combustion distribution manifolds.

6 Claims, 6 Drawing Figures

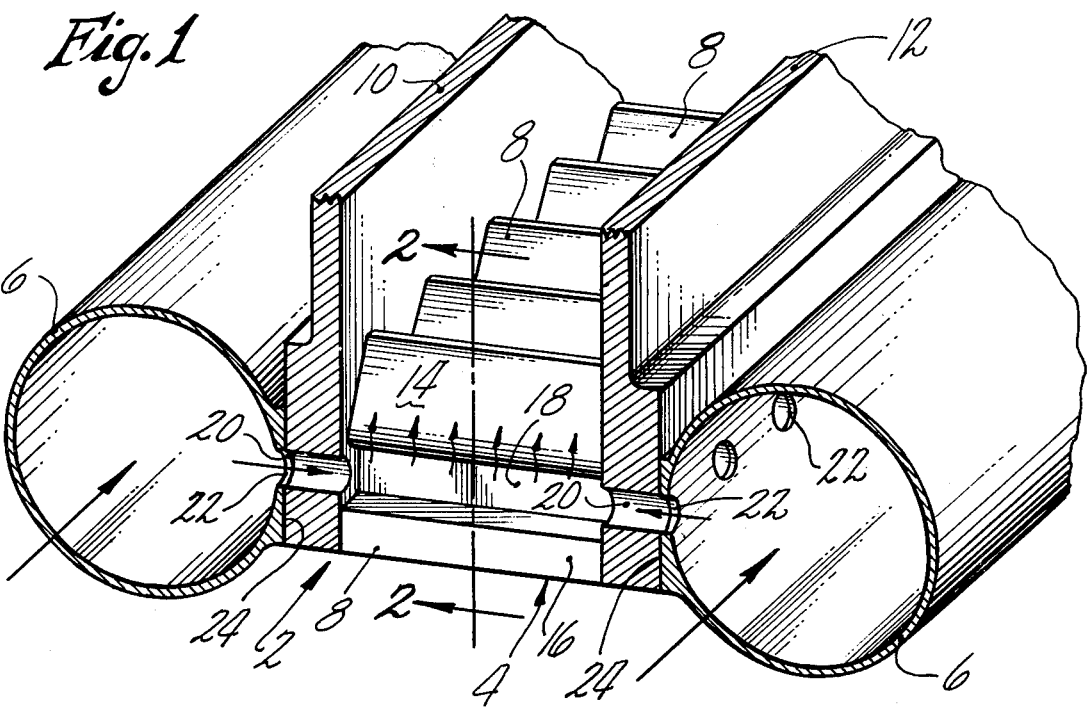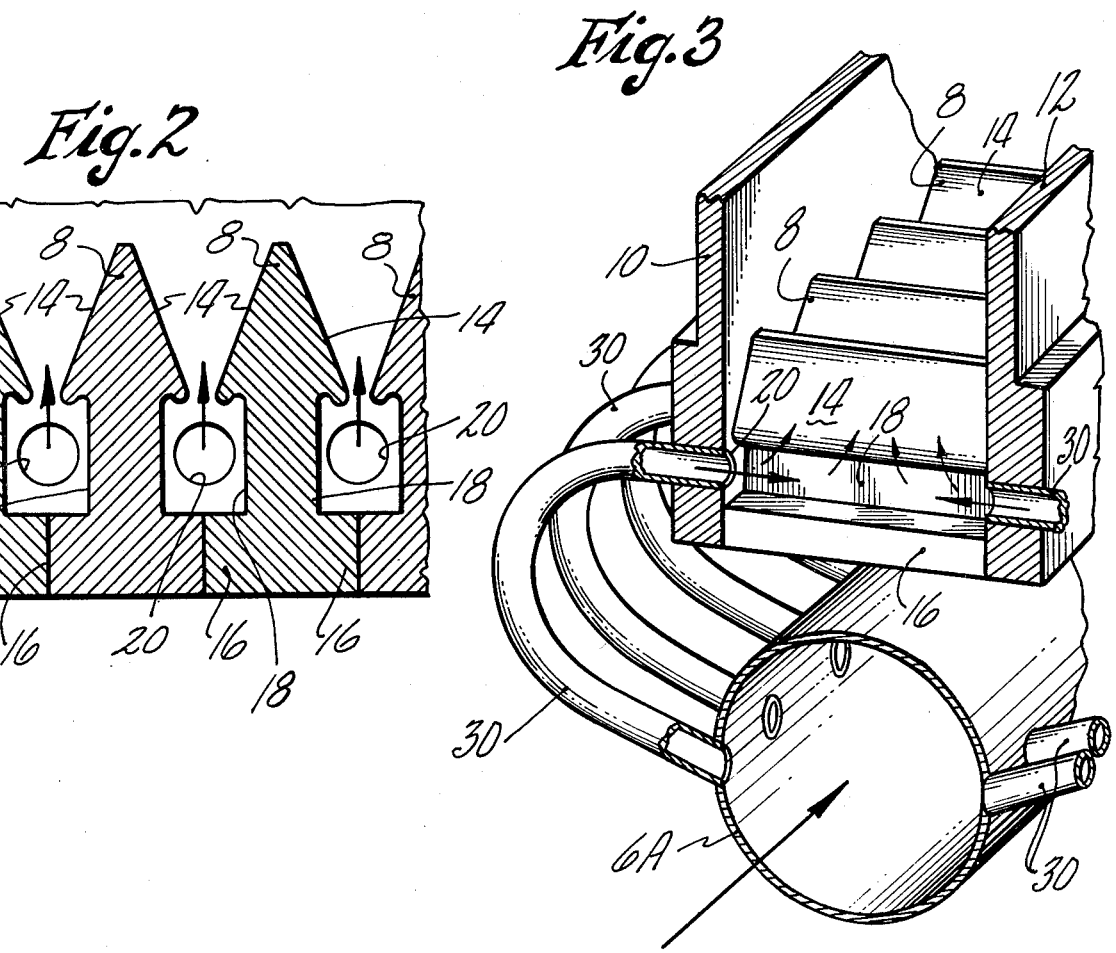

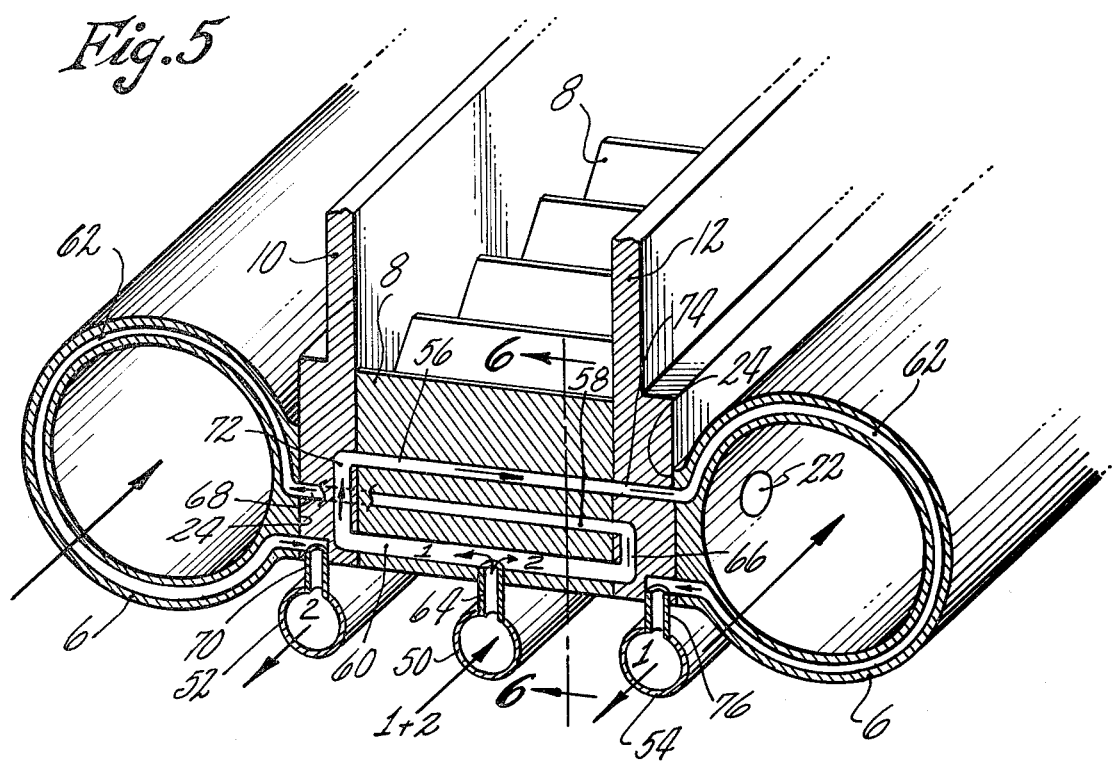
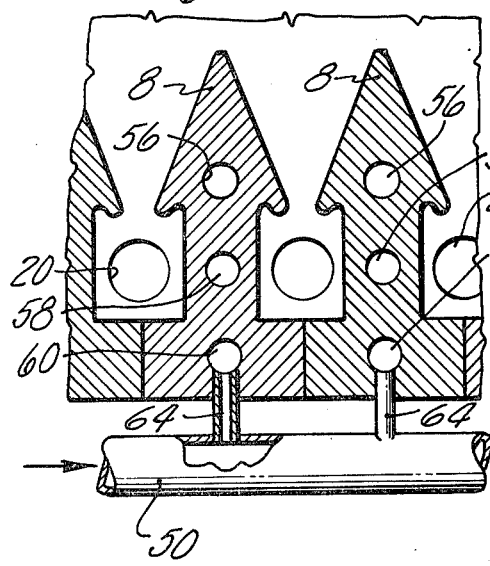
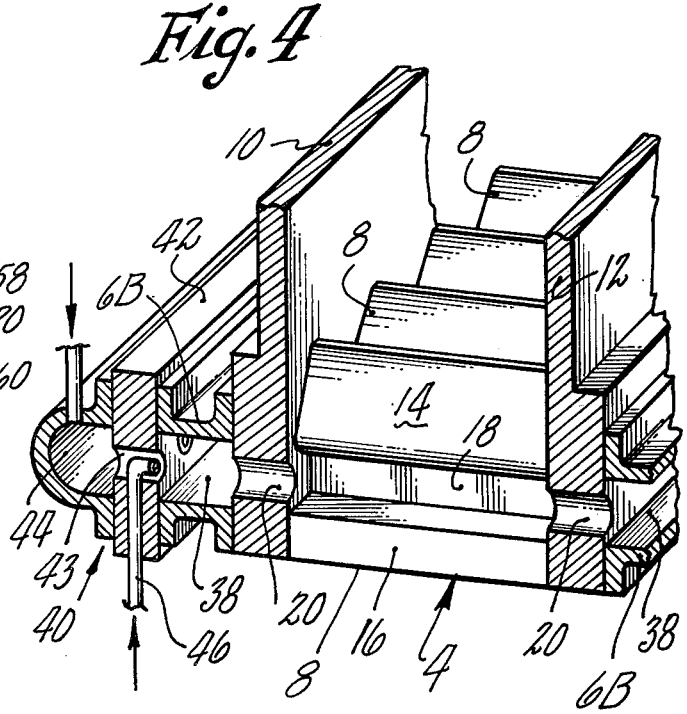

LASER NOZZLE CONSTRUCTION

BACKGROUND OF THE INVENTION

This invention relates to laser nozzles, optical cavity walls, and combustion manifolds. Two patents which show nozzle assemblies having individual laser nozzle members having spaced portions forming a plurality of nozzles extending across a gas manifold, including an optical cavity, are U.S. Pat. Nos. 3,602,432 and 3,819,321. U.S. Pat. No. 3,819,321 also shows an elongated injector head and cooling means. An entire laser system with flow from a combustor through a plurality of nozzles into a lasing region with reflecting walls is shown in U.S. Pat. No. 3,665,336. Another type of laser nozzle and optical cavity wall construction is shown in Application Ser. No. 794,168, now U.S. Pat. No. 4,126,271. It is noted that in the laser nozzle constructions above, the combustion distribution manifold is located behind the spaced portions of the laser nozzle members, or wafers, with flow passing through said spaced members, or wafers, from the back to the front.

SUMMARY OF THE INVENTION

A primary object of the present invention is to provide an arrangement wherein the laser nozzle will provide an integral unit to decrease distortion of the nozzle members during operation.

A further object of the invention is to provide elongated laser nozzle members having two elongated projections on each side thereof, a forward elongated projection and a rearward elongated projection, and when said members are placed together, the rear projections meet to form a solid wall while said forward projections are spaced to form an elongated nozzle as in prior laser nozzle members or wafers. A cavity is formed between the two projections, permitting gas to be fed thereto from each end. This arrangement provides a more balanced pressure load throughout the laser nozzle members.

Another object of the invention is to provide a laser nozzle with an optical cavity downstream which comprises a single structure bonded together. The rear projections of the laser nozzle members extend outwardly further than the forward projections, providing the proper spacing for the forward projections forming the nozzle. The meeting portions of the rear projections of the laser nozzle members are bonded together with side plates being bonded thereto and extending downstream of the nozzle members to form an optical cavity. When a desired length of nozzle members are formed, end plates can be bonded to the exposed side of the laser nozzle member at each end and cooperating ends of the side plates forming the nozzle construction. Holes are formed through the side plates into the cavity formed by the two projections, and manifold means extend the length of the laser nozzle construction to direct lasing gas thereto.

A further object of the invention is to provide a manifold means on each side of said laser nozzle construction being fixed to said side plates, said manifold means being connected to the cavities of said laser nozzle members.

Another object of this invention is to provide a single gas manifold with tubes extending therefrom and being connected to the openings on both sides of the side plates which are connected to the cavities formed between the two projections.

It is another object of the invention to provide an elongated injector which extends for the length of the laser nozzle construction for forming a lasing gas and directing it into the openings in the side plates.

Another object of the invention is to provide cooling means which will cool both the laser nozzle members and manifolds.

BRIEF DESCRIPTION OF THE DRAWINGS

FIG. 1 is a perspective view of a section of a laser nozzle, optical cavity walls and combustion manifolds used in laser devices;

FIG. 2 is an enlarged view taken along the line 2—2 showing a cross-section of the laser nozzle members;

FIG. 3 is a perspective view of the nozzle and optical cavity wall shown in FIG. 1 with a first modified combustion manifold;

FIG. 4 is a perspective view of the nozzle and optical cavity wall shown in FIG. 1 with a second modified combustion manifold and showing an elongated injector head;

FIG. 5 is a perspective view of a modified section of a laser nozzle, optical cavity wall and combustion manifold as shown in FIG. 1, including cooling means; and FIG. 6 is an enlarged view taken along line 6—6 showing a cross-section of the laser nozzle members, including cooling passages.

DESCRIPTION OF THE PREFERRED EMBODIMENT

With reference to FIG. 1, a laser device 2 comprises a laser nozzle construction 4 having an associated combustion distribution manifold 6 on each side thereof. The laser nozzle construction 4 is formed of a plurality of laser nozzle members 8 with a side plate 10 covering one end of the laser nozzle members 8 and a side plate 12 covering the other ends of the laser nozzle members 8. An end plate (not shown) is positioned over the exposed laser nozzle member 8 at each end of the plurality of members, along with the cooperating ends of the side plates 10 and 12.

Each laser nozzle member 8 is formed as an elongated block having two elongated projections on each side thereof along its entire length, a forward projection 14 and a rearward projection 16. When the rearward projections 16 of adjacent laser nozzle members 8 are placed together, they form a solid rear wall, while said forward projections are spaced to form an elongated nozzle as in prior laser nozzle members, or wafers. The rear projections 16 are rectangular in their cross-section, and the forward projections 14 are tapered inwardly as they extend to their forward end so that adjacent surfaces 14 of adjacent nozzle members 8 form an expanding nozzle configuration having a throat. Gas flow cavities 18 are formed between the recessed portions of the adjacent nozzle members 8 between the rear projections 16 and the forward projections 14.

To direct a flow of gas for lasing to the flow cavities 18, openings 20 are provided in the side plates 10 and 12, one at each end of the flow cavity 18 between adjacent nozzle members 8. As seen in FIG. 1, each associated combustion distribution manifold 6 has an opening 22 therein to coincide with each of the openings 20 on a cooperating side plate. Each combustion distribution manifold 6 is formed so that the side having the holes 22 is provided with a flat surface 24 along the length of the combustion distribution manifold 6; this surface 24 is fixed to the outer surface of its cooperating side plate 10 around the holes 20.

With reference to FIG. 3, a single modified combustion distribution manifold 6A is shown behind the nozzle construction 4 having tubes 30 connected to each side thereof. The combustion distribution manifold 6A is provided with one tube 30 on each side thereof connected to each opening 20 in the side plates 10 and 12.

With reference to FIG. 4, another modified combustion distribution manifold 6B is located on each side of the nozzle construction 4. Each combustion distribution manifold 6B comprises an elongated chamber 38 connected to each of side plates 10 and 12 along the line of openings 20 on each side thereof. An injector 40 is fixed to the outer end of each of the chambers 38. Each injector 40 comprises an injector plate 42 fixed to a chamber 38 with an oxidizer manifold fixed to the other side thereof. The injector plate 42 has openings 43 therein for directing the gas from the manifold 44 into the chamber 38. A plurality of conduit means 46 direct fuel to the center of the opening 43 of the manifold 44 to the chamber 38. A separate means can supply desired diluents to said chamber 38.

With reference to FIG. 5, the construction is similar to FIG. 1 with the addition of cooling means. An inlet coolant tube 50 connected to a coolant supply not shown, extends lengthwise adjacent the center of the solid rear wall of the laser nozzle construction 4, and two outlet coolant tubes 52 and 54 extend lengthwise adjacent the rear end of the side walls 10 and 12, respectively. The laser nozzle construction 8, side walls 10 and 12, and combustion distribution manifold 6 each have coolant passages which carry a coolant from the inlet coolant tube 50 to the outlet coolant tubes 52 and 54. Each laser nozzle member 8 has three passageways 56, 58 and 60 extending through its length, and each combustion distribution manifold 6 has a passageway 62 therearound, one for each laser nozzle member 8. Each passageway 62 has a spaced inlet and outlet opening on the surface 24. Said spaced inlet and outlet openings being located between adjacent openings 22. The inlet coolant tube 50 has a plurality of short conduits 64, each conduit 64 being connected to the center of a passageway 60.

Each passageway 60 has an end connected to an end of the passageway 58 by a U-shaped passageway 66 in side plate 12. The other end of passageway 58 is connected to the inlet opening of the cooperating passageway 62, of the combustion distribution manifold 6 located on side plate 10, by passageway 68 in side plate 10. The outlet opening of passageway 62 is connected to the outlet coolant tube 52 by a short passage in the side plate 10 which connects with a short tube member 70 which in turn is connected to the outlet coolant tube 52. The other end of each passageway 60 is connected to an end of the passageway 56 by a U-shaped passageway 72 inside plate 10. The other end of passageway 56 is connected to the inlet opening of its cooperating passageway 62, of the combustion distribution manifold 6 located on side plate 12, by passageway 74 in side plate 12. The outlet opening of passageway 62 is connected to the outlet coolant tube 54 by a short passage in the side plate 12 which connects with a short tube member 76 which in turn is connected to the outlet coolant tube 54. Flow through the system is shown by the number 1 and 2. The coolant fluid can be provided from a source connected to inlet coolant tube 50 and dumped from outlet coolant tubes 52 and 54, or can be passed through a heat exchange unit and directed back to the source or can be passed directly to the chamber 38.

A modification to this laser nozzle construction is shown in Application Ser. No. 863,493, assigned to the assignee of this application, being filed herewith, to Roger L. Wahl et al for "LASER NOZZLE CONSTRUCTION".

We claim:

1. A laser nozzle comprising a plurality of stacked elongated nozzle members, each nozzle member having two elongated projections on each side thereof, a forward projection and a rearward projection, each rearward projection being formed having a flat outer surface, each forward projection being formed having a tapered outer surface, said tapered outer surface tapering inwardly as it extends to the forward end of the nozzle member, said nozzle members being placed adjacent each other so that in their stack the flat surfaces of the rear projections meet to form a solid wall and said forward projections are spaced, adjacent forward projections of adjacent nozzle members forming an elongated nozzle, a cavity being formed between each pair of meeting rearward projections and spaced forward projections of adjacent nozzle members, side plates enclosing the ends of the plurality of nozzle members, end plates being placed at each end enclosing the ends of the cooperating side plates and exposed surface of the end nozzle members, openings in said side plates being connected to the cavities formed by the projections for directing a lasing gas thereto.

2. A laser nozzle as set forth in claim 1 wherein said flat surfaces of adjacent rear projections are bonded together, said side plates are fixed against the ends of the plurality of nozzle members and bonded thereto, said end plates are fixed against the ends of the cooperating side plates and exposed surface of the end nozzle members and bonded thereto, said bonding providing an integral construction.

3. A combination as set forth in claim 1 wherein a gas distribution manifold is fixed to each side plate along its length, second openings in each of said gas distribution manifolds cooperating with each of the openings in each of said side plates.

4. A combination as set forth in claim 1 wherein a gas distribution manifold extends along the length of said stacked elongated nozzle members adjacent the outer wall, said gas distribution manifold having openings along each side thereof, the openings on either side thereof comprising one opening for each of the openings in the side plate adjacent that side of the gas distribution manifold, conduits connecting each opening in the sides of the gas distribution manifold with its cooperating opening in the respective side plate located thereabove.

5. A combination as set forth in claim 3 including a coolant inlet conduit extending along the length of the stacked elongated nozzle members; coolant outlet conduit means located adjacent said coolant inlet conduit; coolant passages in said nozzle members, side plates, and said gas distribution manifold connecting said coolant inlet conduit to said coolant outlet conduit means.

6. A combination as set forth in claim 5 wherein said coolant outlet conduit means comprises a coolant outlet conduit on each side of said coolant inlet conduit, each nozzle member having three passages extending from one end to the other, said passages comprising a first passage, a second passage, and a third passage, said three passages extending in line from the rearward to the forward projection, each gas distribution manifold having a plurality of passageways therearound, one passageway in each gas distribution manifold for each nozzle member, each one passageway having an inlet and outlet adjacent its cooperating side plate, said coolant inlet conduit being connected to the center of the first passage of each of said nozzle members, one end of each first passage being connected to one end of its aligned second passage, the other end of said second passage being connected through its side wall to an inlet of its cooperating passageway in its cooperating gas distribution manifold, the outlet of each last named cooperating passageway being connected to one of said coolant outlet conduits, the other end of each first passage being connected to one end of its aligned third passage, the other end of said third passage being connected through its side wall to an inlet of its cooperating passageway in its cooperating other gas distribution manifold, the outlet of each last mentioned cooperating passageway being connected to the other of said coolant outlet conduits.

* * * * *